(12) United States Patent
Castelli et al.

(10) Patent No.: US 9,552,595 B2
(45) Date of Patent: *Jan. 24, 2017

(54) SYSTEM AND METHOD FOR ITEM INQUIRY AND INFORMATION PRESENTATION VIA STANDARD COMMUNICATION PATHS

(71) Applicant: INTERNATIONAL BUSINESS MACHINES CORPORATION, Armonk, NY (US)

(72) Inventors: Vittorio Castelli, Croton on Hudson, NY (US); Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 323 days.

This patent is subject to a terminal disclaimer.

(21) Appl. No.: 14/078,810

(22) Filed: Nov. 13, 2013

(65) Prior Publication Data

US 2014/0067560 A1 Mar. 6, 2014

Related U.S. Application Data

(63) Continuation of application No. 13/781,835, filed on Mar. 1, 2013, now Pat. No. 8,850,331, which is a continuation of application No. 12/328,269, filed on Dec. 4, 2008, now Pat. No. 8,458,601.

(51) Int. Cl.
*G06F 3/048* (2013.01)
*G06Q 30/02* (2012.01)
*H04L 12/58* (2006.01)

(52) U.S. Cl.
CPC .......... *G06Q 30/0277* (2013.01); *G06Q 30/02* (2013.01); *H04L 12/581* (2013.01); *H04L 51/04* (2013.01)

(58) Field of Classification Search
USPC ....................................................... 715/757
See application file for complete search history.

(56) References Cited

U.S. PATENT DOCUMENTS

| 5,828,839 | A | 10/1998 | Moncreiff |
| 6,061,716 | A | 5/2000 | Moncreiff |
| 6,948,131 | B1 | 9/2005 | Neven et al. |

(Continued)

OTHER PUBLICATIONS

"Softpedia", Jun. 5, 2007, available at http://news.softpedia.com/news/World-of-Warcraft-and-Windows-Vista-DirectX-10-Compatibility-57452.shtml, retrieved Sep. 28, 2011.

(Continued)

*Primary Examiner* — Matthew Ell
(74) *Attorney, Agent, or Firm* — Lisa Ulrich; Andrew M. Calderon; Roberts Mlotkowski Safran Cole & Calderon, P.C.

(57) ABSTRACT

A method and system is provided for item inquiry and information presentation via standard communication paths. More particularly, the method and system detects an item associated with an avatar of a virtual universe (VU) user in a VU and determine information associated with the item. Additionally, the method and system are operable to display the information in the VU in a high-resolution component of the VU.

20 Claims, 6 Drawing Sheets

(56) References Cited

U.S. PATENT DOCUMENTS

| | | | |
|---|---|---|---|
| 7,039,677 | B2 | 5/2006 | Fitzpatrick et al. |
| 7,143,428 | B1 | 11/2006 | Bruck et al. |
| 2002/0112002 | A1 | 8/2002 | Abato |
| 2003/0156134 | A1 | 8/2003 | Kim |
| 2004/0044627 | A1 | 3/2004 | Russell et al. |
| 2004/0071315 | A1* | 4/2004 | Neely ............... G01S 13/74 382/103 |
| 2004/0266505 | A1 | 12/2004 | Keam et al. |
| 2005/0022139 | A1 | 1/2005 | Gettman et al. |
| 2005/0137015 | A1 | 6/2005 | Rogers et al. |
| 2005/0216346 | A1 | 9/2005 | Kusumoto et al. |
| 2006/0064645 | A1 | 3/2006 | Neven et al. |
| 2007/0033259 | A1 | 2/2007 | Wies et al. |
| 2007/0112630 | A1 | 5/2007 | Lau et al. |
| 2008/0120539 | A1 | 5/2008 | Stephens |
| 2009/0091571 | A1* | 4/2009 | Zalewski ............ G06Q 30/02 345/427 |

OTHER PUBLICATIONS

"GameSpy", Dec. 7, 2004, available at http://pc.gamespy.com/pc/world-of-warcraft/571585p3.html, retrieved Sep. 28, 2011.

"IGN", Dec. 10, 2004, available at http://pc.ign.com/articles/572/572070p7.html, retrieved Sep. 28, 2011.

"Second Thoughts" available at http://secondthoughts.typepad.com/second_thoughts/2008/11/big-glitch-at-w.html, Nov. 12, 2008.

Wikipedia: World of Warcraft, http://reply.waybackmachine.org/20071203032431/http://en.wikipedia.org/wiki/World_of_Warcraft#Virtual_community, retrieved Dec. 3, 2007.

"Inspecting" available at http://reply.waybackmachine.org/20080927080200/http://wow.curse.com/downloads/wow-addons/details/examiner.aspx, retrieved Sep. 27, 2008.

Office Action dated Dec. 10, 2013 for U.S. Patent Application No. 13/13/781,835; 16 pages.

Notice of Allowance dated May 22, 2014 in U.S. Appl. No. 13/781,835; 7 pages.

* cited by examiner

SYSTEM AND METHOD FOR ITEM INQUIRY AND INFORMATION PRESENTATION VIA STANDARD COMMUNICATION PATHS

FIELD OF THE INVENTION

The present invention generally relates to computer-based virtual universes, and more specifically, to a method and system for item inquiry and information presentation via standard communication paths.

BACKGROUND

Virtual universes (VUs) are rapidly becoming a popular part of today's culture. A VU is a computer-based simulated environment. Many VUs are represented using 3-D graphics and landscapes, and are populated by many thousands of users, known as "residents". Often, the VU resembles the real world such as in terms of physics, places, and landscapes.

VUs are also known as metaverses and "3D Internet." Some example VUs include: SECOND LIFE™, ENTROPIA UNIVERSE®, THE SIMS ONLINE™ and THERE™—as well as massively multiplayer online games such as EVERQUEST®, ULTIMA ONLINE™ LINEAGE® and WORLD OF WARCRAFT®. (SECOND LIFE is a trademark of Linden Research, Inc. in the United States and/or other countries. ENTROPIA UNIVERSE is a registered trademark of MindArk PE AB in the United States, other countries, or both. THE SIMS ONLINE and ULTIMA ONLINE are trademarks of Electronic Arts, Inc. in the United States, other countries, or both. THERE is a trademark of Makena Technologies, Inc. in the United States, other countries, or both. EVERQUEST is a registered trademark of Sony Corporation of America, Inc. in the United States, other countries, or both. LINEAGE is a registered trademark of NCsoft Corporation in the United States, other countries, or both. WORLD OF WARCRAFT is a registered trademark of Blizzard Entertainment, Inc. in the United States, other countries, or both.)

A VU is intended for its residents to traverse, inhabit, and interact through the use of avatars. In operation, user(s) control the avatar(s). An avatar is a graphical representation selected by the user, often taking the form of a cartoon-like human or other figure. The user's account, upon which the user can build an avatar, is tied to an inventory of assets the user owns, such as, for example, clothing, weapons, artwork, furniture, virtual pets, houses, virtual vehicles, and landmarks, amongst other assets. A region is a virtual area of land within the VU, typically residing on a server's central processing unit (CPU). A user context includes a very broad range of attributes that describe the user, and which are relevant to their behavioral, search and other informational needs.

The data representation of an object or item in the VU is stored as information, e.g., as data or metadata. The object may be created by an object creator, e.g., a VU manager, a user, etc. In some VUs, larger objects are constructed of smaller objects, termed "prims" for primitive objects. These "prims" usually include boxes, prisms, spheres, cylinders, tori, tubes and/or rings. The "prims" may be rearranged, resized, rotated, twisted, tapered, dimpled and linked to create larger composite objects. The creator of such an object may then map a texture or multiple textures to the object. Texture mapping is a method of adding detail, surface texture, or color to a computer-generated graphic or 3D model. When the object is to be rendered, this information is transmitted from the VU server to the client.

An inventory of assets comprises objects or items associated with the user's individual avatar or placed by them on virtual land they own or on public land. Such objects or items may have been created by the resident from prims, purchased, or obtained for free. Examples of objects include clothing, weapons, artwork, furniture, virtual pets, houses, virtual vehicles, and landmarks, amongst other objects. Assets, avatar(s), the environment, and everything else visually represented in the VU each comprise universally unique identifiers (UUIDs) (tied to geometric data distributed to user(s) as textual coordinates), textures (distributed to user(s) as graphics files), and effects data (rendered by the user's client according to the user's preference(s) and user's device capabilities).

Artifacts, which may be referred to as items or assets, may be used as fashion items or may provide the avatar with additional capabilities. Artifacts may be purchased, obtained as gifts, or obtained as a result of specific quests depending on the rules governing the VU. Furthermore, it is common to allow avatars to exchange artifacts either for free or as a result of a monetary transaction. Certain artifacts are highly prized, for example, because they enable specific functionality, or because they are fashionable. For example, there are individuals who design clothes to be worn by avatars. It is considered a virtual art form to design a piece of clothing that is attractive in low-resolution VUs.

Avatars typically interact in the VU using the known chat-room and instant message technology. In one aspect, to mimic the behavior of real life, when an avatar "speaks", a text window appears on the user interface of the other avatars who are within "hearing range" (hearing range may vary depending on whether an avatar "speaks" normally, "whispers", or "shouts").

In the real world, a common form of advertising and marketing consists of distributing merchandise with company logos and/or names, slogans, etc. Such artifacts may include, for example, hats, T-shirts, mugs, pens, toys, etc. However, the limited rendering capabilities of current VUs prevents this form of advertising/marketing from being effectively used in a VU. That is, presently, due to restricted computational capacity and networking resources, VUs render simplified versions of objects often eliding graphical details. Moreover, as a result of current limitations of graphics hardware and software, 3-D graphics representations with 2-D textures mapped onto the surfaces of 3-D objects often do not have sufficient detail and clarity. Additionally, even with excellent graphics, users often are not able to read small-sized text on moving objects under typical lighting and viewing conditions, and when the text may be obscured by intervening objects. Avatars generally have only prominent features rendered resulting in a cartoon-like appearance. Additionally, an avatar's wearable or otherwise portable artifacts, such as clothing, hats, jewels, bags, et cetera, often receive simplified rendering. Due to the rendering restrictions of VUs, it is difficult to advertise and market products in a virtual universe by placement of logos, slogans and company names on items that are either on or with an avatar.

SUMMARY OF THE INVENTION

In a first aspect of the invention, a method is implemented in a computer infrastructure having computer executable code. The method comprises detecting an item associated with an avatar of a virtual universe (VU) user in a VU and determining information associated with the item. Additionally, the method comprises displaying the information in the VU in a high-resolution component of the VU.

In another aspect of the invention, a system comprises a virtual universe (VU) monitoring tool configured to detect an item associated with an avatar of a VU user in a VU and determine promotional information associated with the item. Additionally, the system comprises a display tool configured to display the promotional information in the VU in a high-resolution component of the VU.

In an additional aspect of the invention, a computer program product comprising a computer usable storage medium having readable program code embodied in the medium is provided. The computer program product includes at least one component to detect an item associated with an avatar of a virtual universe (VU) user in a VU and determine if the avatar is currently using the item. Additionally, the at least one component is configured to determine information associated with the item and display the information in the VU in a high-resolution component of the VU, wherein the item associated with an avatar is an item contained in the user's inventory.

In a further aspect of the invention, a method comprises providing a computer infrastructure operable to detect an item associated with an avatar of a virtual universe (VU) user in a VU and determine information associated with the item. Additionally, the computer infrastructure is operable to display the information in the VU in a high-resolution component of the VU, wherein the high-resolution component of the VU comprises at least one of: a chat window, a bubble window, a graphical user interface (GUI) status bar, a GUI title bar, a map window and an audio output device.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

The present invention generally relates to computer-based virtual universes, and more particularly, to a method and system for item inquiry and information presentation via standard communication paths. More specifically, the present invention is related to a system and method for displaying information associated with artifacts, e.g., items worn or carried by avatars, by clearly rendering relevant information through a plurality of methods including, for example, display in a chat window, under a multitude of circumstances, and through prescribed triggers. The present invention enables, for example, logo/text and/or slogan advertising and marketing within a VU. Also, the present invention surmounts the limited rendering resolution of a VU to enable company names, logos, or promotional slogans associated with the artifacts to be clearly visible within the VU. The present invention may also be used to provide information associated with artifacts that are not currently visible or in view.

The present invention enables advertising in virtual universe by describing methods and systems in which promotional wearable artifacts are clearly displayed to other avatars, e.g., in high-resolution. This enhancement creates brand awareness, which is valuable to companies that distribute virtual goods. Furthermore, a VU operator or service provider may increase revenue by charging a fee for using this service. Finally, some virtual objects may be valuable or limited and users may wish others to know which brands they have purchased.

By implementing the present invention, a creator, distributor, or seller of an item (e.g., avatar clothing) may derive additional revenue from clear renderings of logos, slogans, and company names on VU items. Users may also enhance brand awareness through enhanced renderings. The display of such information in a chat window (e.g., conversation or instant message window) may have particular utility in that the chat window is a user-interface element that already exists and with which users are familiar, and a chat window typically displays clear and easy-to-read text. Moreover, a user's attention is often focused on the chat window area, and thus, any information presented there is likely to be seen by a user. Finally, employing a chat window for promotional text results in the promotional text being sequestered to a region of the screen not likely to interfere with the viewing of the primary graphical content of the VU, which might otherwise be obscured with numerous text labels.

Additionally, it should be noted that trends towards both increasingly powerful simulation engines and client-side graphics cards may improve VU rendering. However, the invention contemplates that VU access may be achieved through mobile devices and other non-conventional (often lower resolution) platforms, which would benefit from the present invention.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, or
a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

Figure 1:
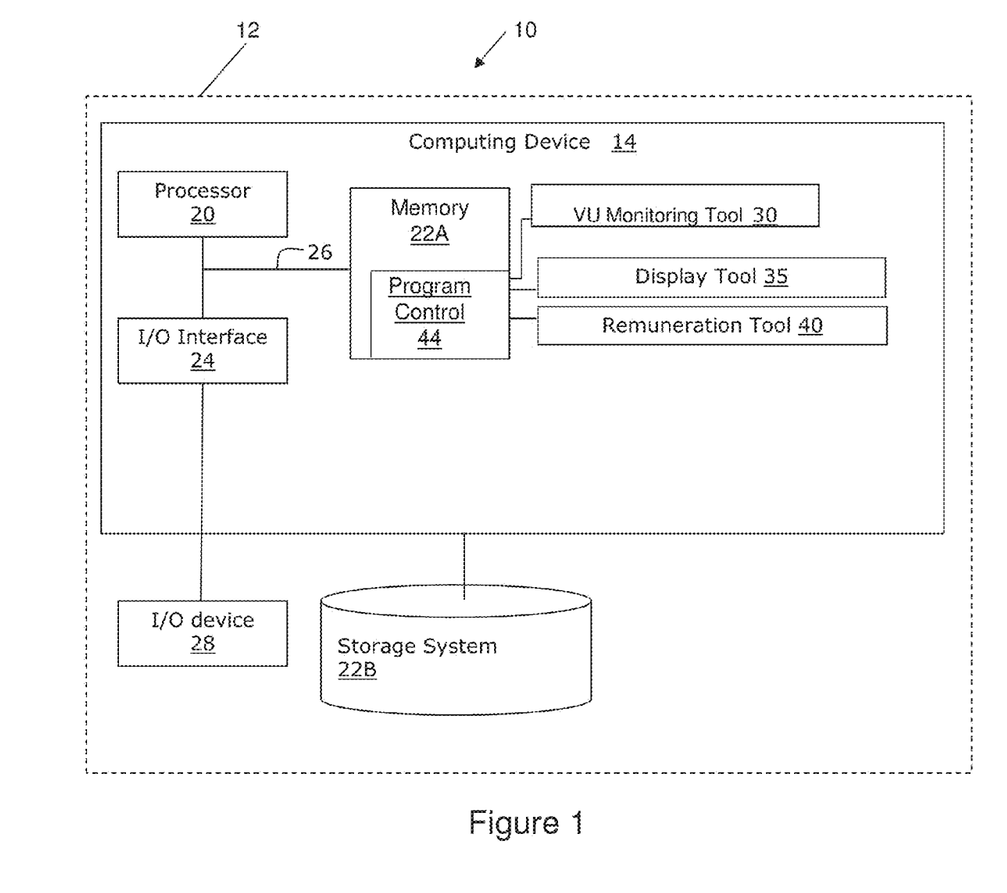
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein using a computing device 14. The computing device 14 includes a VU monitoring tool 30, a display tool 35 and a remuneration tool 40. These tools are operable to facilitate a detection of item promotional information, determination of available high-resolution components, conflict resolution, promotional information display and remuneration, e.g., the processes described herein.

The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution.

Further, the computing device 14 is in communication with an external I/O device/resource 28. The I/O device 28 can interact with the computing device 14 or any device that enables the computing device 14 to communicate with one or more other computing devices using any type of communications link. The external I/O device/resource 28 may be keyboards, displays, pointing devices, etc. Additionally, in embodiments, the computing device 14 includes a storage system 22B.

The processor 20 executes computer program code (e.g., program control 44) processes on computer media, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the computer infrastructure 12 may communicate with another computer infrastructure, which is operating the VU. However, the invention contemplates that the computer infrastructure 12 may operate the VU monitoring tool 30, the display tool 35 and the remuneration tool 40, and operate the VU.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Item Inquiry

According to aspects of the invention, the VU monitoring tool 30 may monitor a user's items contained in their inventory, e.g., items and assets worn by a user, to detect which items contain promotional information for display to other avatars. The VU monitoring tool 30 may identify those items associated with promotional information that may be displayed in high-resolution areas of the VU (or presented in audio format). Additionally, the VU monitoring tool 30 may retrieve the promotional information, for example, from a database, e.g., storage system 22B.

For example, organizations, e.g., businesses, may establish marketing awareness campaigns in a VU that may include giving away, e.g., clothing items for avatars that are virtually embroidered with the organization's logo. As a benefit or incentive for wearing the virtual clothing item, e.g., for a specified duration, the user may gain access to premium areas of the VU. The relationship between the user and the item (with its associated promotional information), e.g., given to the user may be stored in a database (e.g., storage system 22B) or as metadata for the item.

In embodiments, the VU monitoring tool 30 may monitor which items are worn or used and which items are kept in an inventory of a user using known virtual universe rendering techniques. Additionally, the VU monitoring tool 30 may determine which artifacts contain promotional information through several potential methods.

With a first exemplary method, the representation of artifacts used by the VU system may be extended to include promotional information. For example, if artifacts are described using an object-oriented language (e.g., Java, C++, etc.), this extension can include adding to the base class of the artifact objects a field to contain such promotional information. Further, a VU database, e.g., storage system 22B, may be created to associate object items with promotional information. The promotional information may include UUIDs of company logos, the name of the company or a company slogan, amongst other promotional information. Database retrieval procedures known in the art may be used to detect if an item has associated promotional information, and to retrieve that associated information. In embodiments, the items may be uniquely indexed by the item UUID. Additionally, metadata may be included with the item that describes the promotional characteristics of that item. Metadata may include, for example, the UUID of a company logo, a company logo embedded in the metadata, or company text or promotional messages (visual and/or audible), amongst other metadata.

High-Resolution Component Detection

Additionally, the VU monitoring tool 30 may determine which high-resolution components of a graphical user interface (GUI) are available for displaying the promotional information. These high-resolution components of the GUI may include, for example: a chat window used to communicate between users; a bubble window, or other high-resolution component that displays the VU name of the user; and/or a status bar or title bar on the GUI, or similar GUI regions capable of displaying regular text or graphical information.

The VU monitoring tool 30 may identify all available high-resolution GUI components, and their respective capabilities. For example, certain high-resolution components may only display text, while other components may display both text and graphics. Additionally, some components may provide audio output. Furthermore, some high-resolution components may have limitations on the length of the text they can display, etc. According to an aspect of the invention, using normal rendering procedures the VU monitoring tool 30 may ascertain which high-resolution components are available, such as a chat window, a bubble window, a GUI status bar or audio output, and their respective capabilities.

In embodiments, the present invention may be used with a variety of end devices (i.e., the devices used to view the VU), e.g., a personal computer, a smart phone, a personal digital assistant (PDA) or cell phone, amongst other devices. According to the invention, the VU monitoring tool 30 may detect what type of end device is being used to view the VU. In embodiments, the VU monitoring tool 30 may use a filter that adjusts the same content appropriately for a particular end device. For example, if a user was traversing the VU via a PDA, the PDA may provide less resolution as compared to a personal computer. Thus, the VU monitoring tool 30 may determine, for example, that lower-resolution information presentation, e.g., text in a status bar, may be appropriate for displaying the promotional material on the end user's PDA. Additionally, for example, large logos or large amounts of text may not be appropriate for display in the chat text window next to a user's name, as chat text window medium may only provide one line for display of the promotional material.

Information Presentation

According to further aspects of the invention, the display tool 35 may use one or more high-resolution components to display the promotional information associated with the user's item. For example, the display tool 35 may use one or more of a chat window, a bubble window, a GUI status bar or title bar, and an audio output component to display, e.g., visually or audibly, the promotional information associated with the user's item. Information that may be presented may include a company logo, a company name, a company slogan, a company jingle, product information, clothing information, avatar feature information, and a web link, amongst other information. In embodiments, the display tool 35 may match the promotional characteristics of the item with the rendering capabilities for the area. Such matching may be done with technology known in the art of computational matching algorithms.

1. Avatar Chat Window Enhancement

Presently, when a user enters into a chat session with another party in a VU, the name of the user appears in the chat area before the text allowing other users to identify the party talking. It is common for the name of the user to appear in different font or color, so that it is easy to follow a multi-party conversation.

Figure 2A:
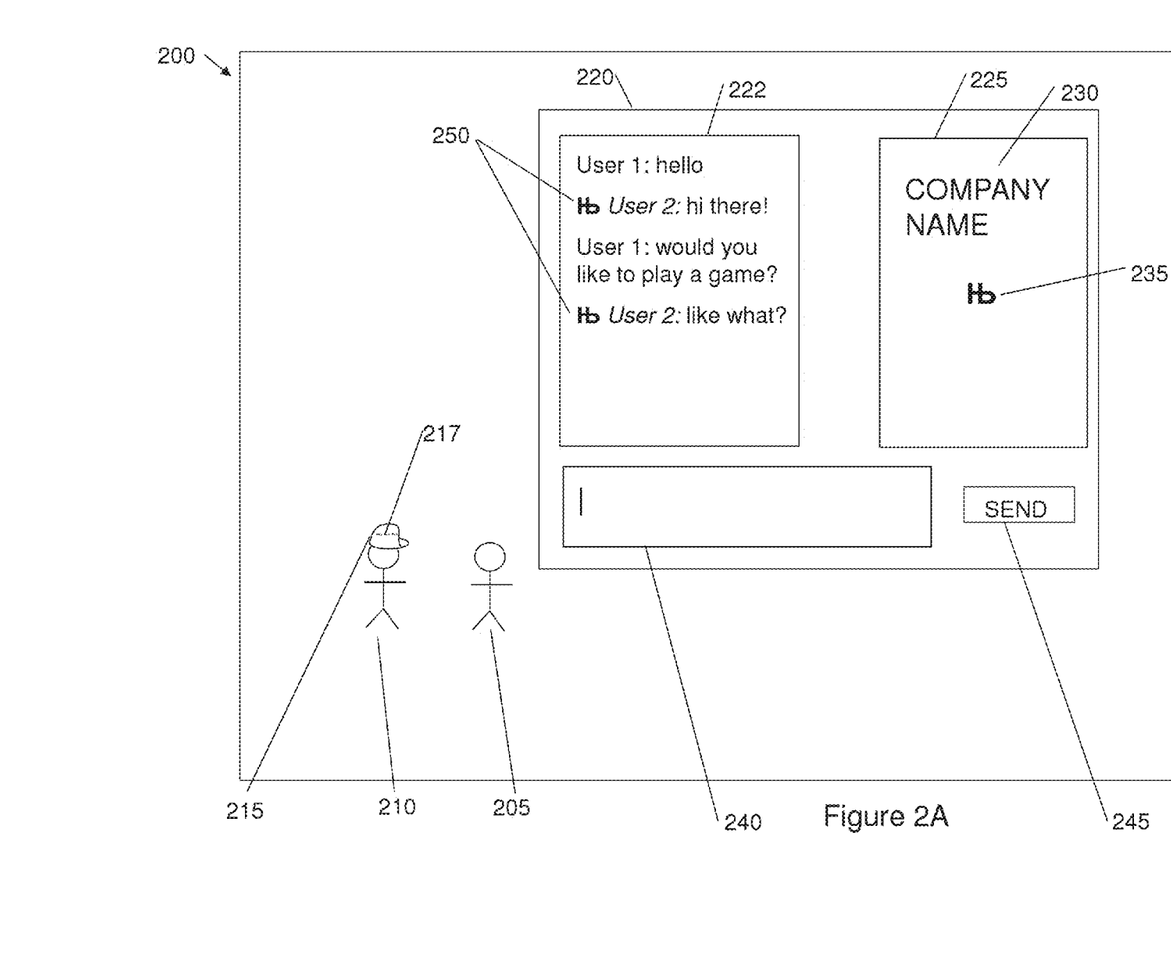
FIG. 2A shows an exemplary chat window enhancement in accordance with the invention.

FIG. 2A shows an exemplary avatar chat window enhancement according to an aspect of the invention. As shown in FIG. 2A, a screen shot 200 displays a first avatar 205 (User 1) and a second avatar 210 (User 2). For example, FIG. 2A shows a screen shot as would be viewed on the first avatar's 205 display. The second avatar 210 is wearing a promotional item 215, which may include low resolution text or images 217. As can be observed in FIG. 2A, as the text or image 217 on the item 215 may be low-resolution, it may be difficult for users of the VU to discern the text or image 217.

FIG. 2A also shows a chat window 220, indicating that a chat has been initiated between the first avatar 205 and the second avatar 210. The chat window 220 includes a text window 222, which displays the ongoing chat, a text entry window 240 which User 1 may use to enter text for the chat, and a send button 245, which is used to send the text entered in the text entry window 240. Additionally, in embodiments, the chat window 220 includes a high-resolution window 225 for displaying information, e.g., promotional material, associated with items of User 2.

According to aspects of the invention, the VU monitoring tool 30 may detect the user's items with associated promotional material, e.g., hat 215, and may store this detected information in a database, e.g., storage system 22B. Additionally, the VU monitoring tool 30 may detect a usage of the item 215, e.g., placing the organization-provided clothing onto the avatar. When the VU monitoring tool 30 detects a usage of the promotional item 215, when that avatar 210 (User 2) engages in a chat, the display tool 35 may provide promotional text and/or images in the chat window 220 of at least User 1's display, e.g., adjacent to the text window 222 in a high-resolution window 225 and/or next to the user's avatar name (e.g., User 2) 250 in the text window 222. In embodiments, the promotional text and/or images may include a company's name 230 and/or a company's logo 235, amongst other promotional material. Additionally, the promotional text and/or images may include text stating, for example, "User 2 is wearing a hat from Company A."

Figure 2B:
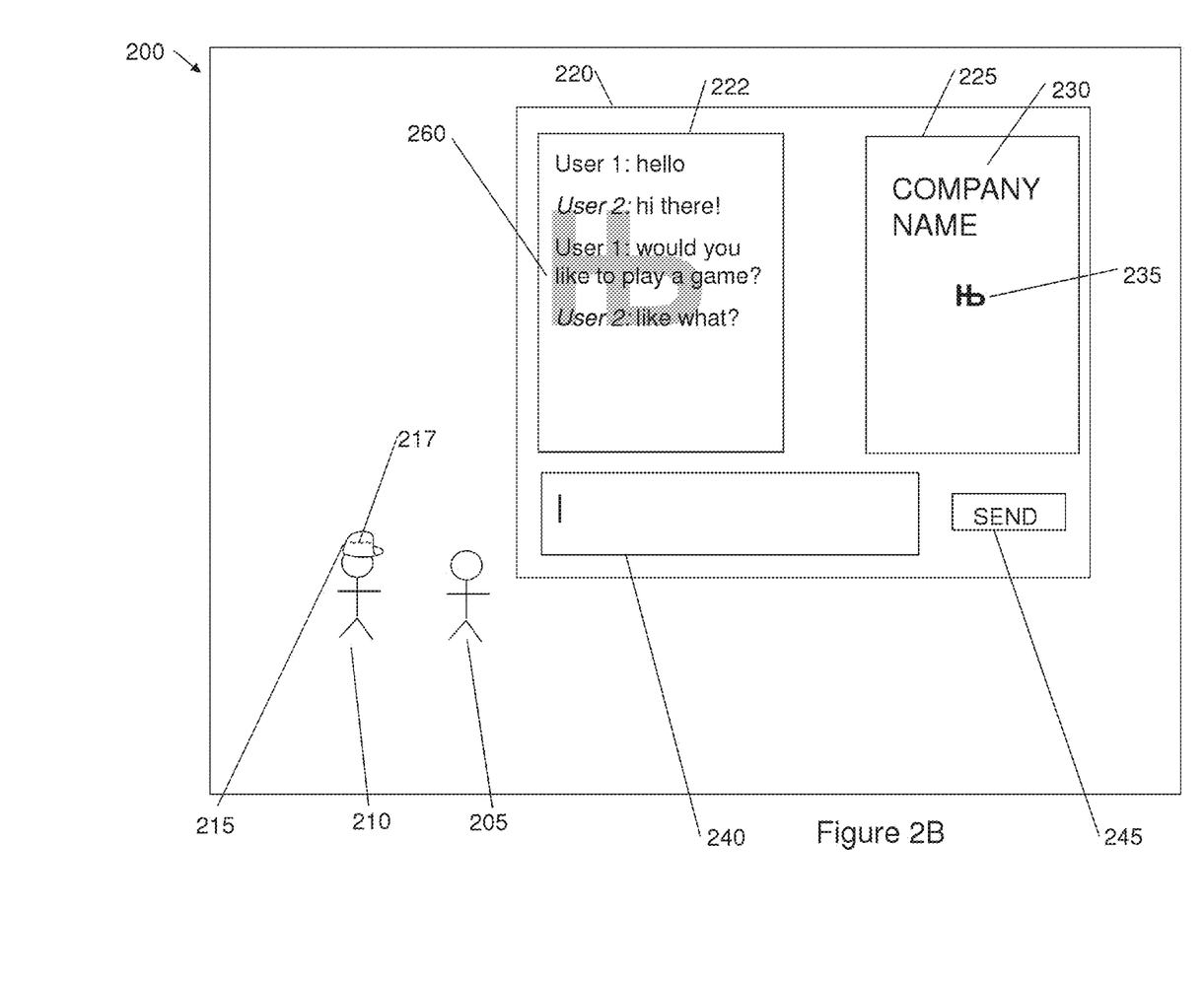
FIG. 2B shows an additional exemplary chat window enhancement in accordance with the invention.

FIG. 2B shows an additional chat window enhancement embodiment, wherein the promotional text and/or images 260 may be displayed in the text window 222 with a transparent effect. As shown in FIG. 2B the promotional text and/or images 260 has a watermark-like effect, which does not obscure the ongoing chat in the text window 222.

2. Bubble Window Enhancement

Figure 3:
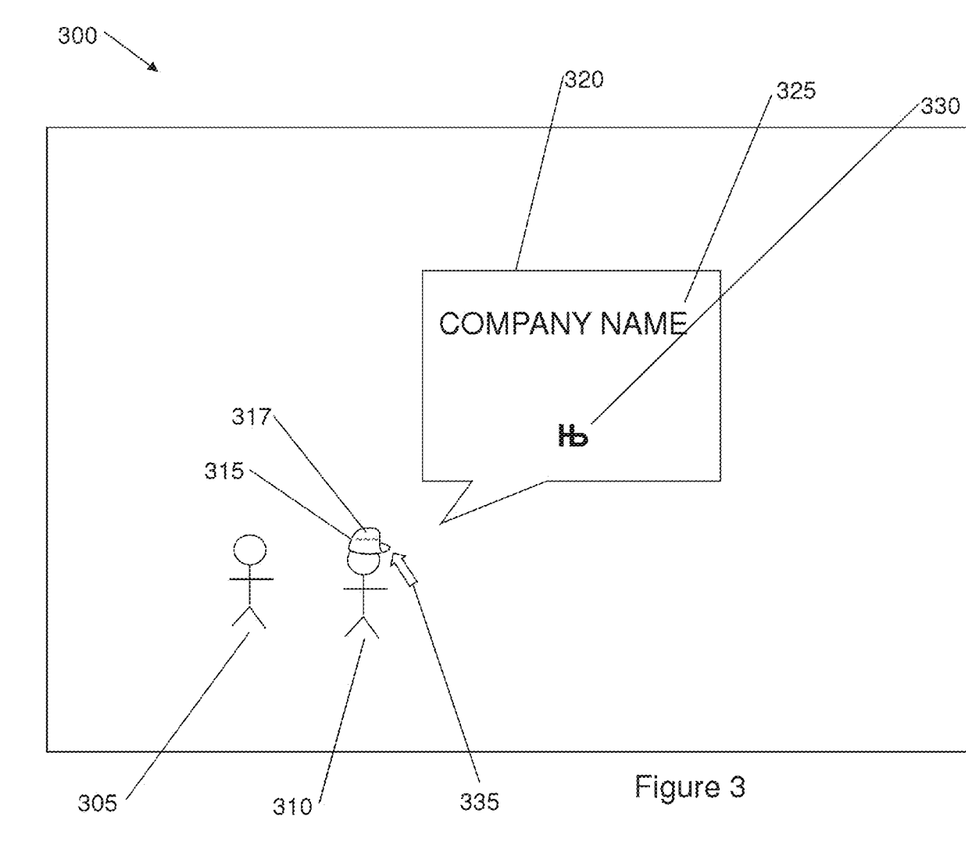
FIG. 3 shows an exemplary bubble window enhancement in accordance with the invention.

According to further aspects of the invention, a bubble window, e.g., a high-resolution rending bubble, may be used to display information, e.g., promotional information, within a VU. Bubble windows may be instantiated, for example, by hovering an input device over an object to request more information about the object.

For example, an avatar may purchase an expensive virtual hat. Such an item may be expensive for a variety of reasons, including, for example, the number of hours needed by an artist to create a realistic look or the number of hours needed to provide sophisticated behavioral scripts or security features associated with the clothing artifact. Additionally, the hat item may contain metadata indicating the brand name should be rendered in high-resolution. Accordingly, the item owner may enable the high-resolution rendering option for the item. In embodiments, the VU monitoring tool 30 may detect the enabled high-resolution rendering option and may store this detected information in a database, e.g., storage system 22B. Additionally, in embodiments, a user may not be given an option to display the promotional material. Rather, the promotional material may automatically be displayed based on, e.g., an agreement entered when the item was acquired.

FIG. 3 shows an exemplary bubble window enhancement according to an aspect of the invention. FIG. 3 shows a screen shot 300 of a display as would be seen by a user of the first avatar 305 on the user's end device. Additionally, FIG. 3 shows a second avatar 310 wearing an item, e.g., a hat 315 containing promotional material 317. According to an aspect of the invention, another user, e.g., the first avatar 305 may see the second avatar 310 and hover their input device pointer 335, e.g., mouse, over (or in proximity to) the second avatar 310 (or in some embodiments the item 315 of the second avatar 310) to receive more information about the second avatar 310 (or the second avatar's item 315). According to an aspect of the invention, the VU monitoring tool 30 may detect this request for more information and may direct the display tool 35 to display a high resolution bubble 320 containing, e.g., the name of the hat brand 325 and/or the hat brand's high resolution logo 330.

3. Status Bar Enhancement

Figure 4:
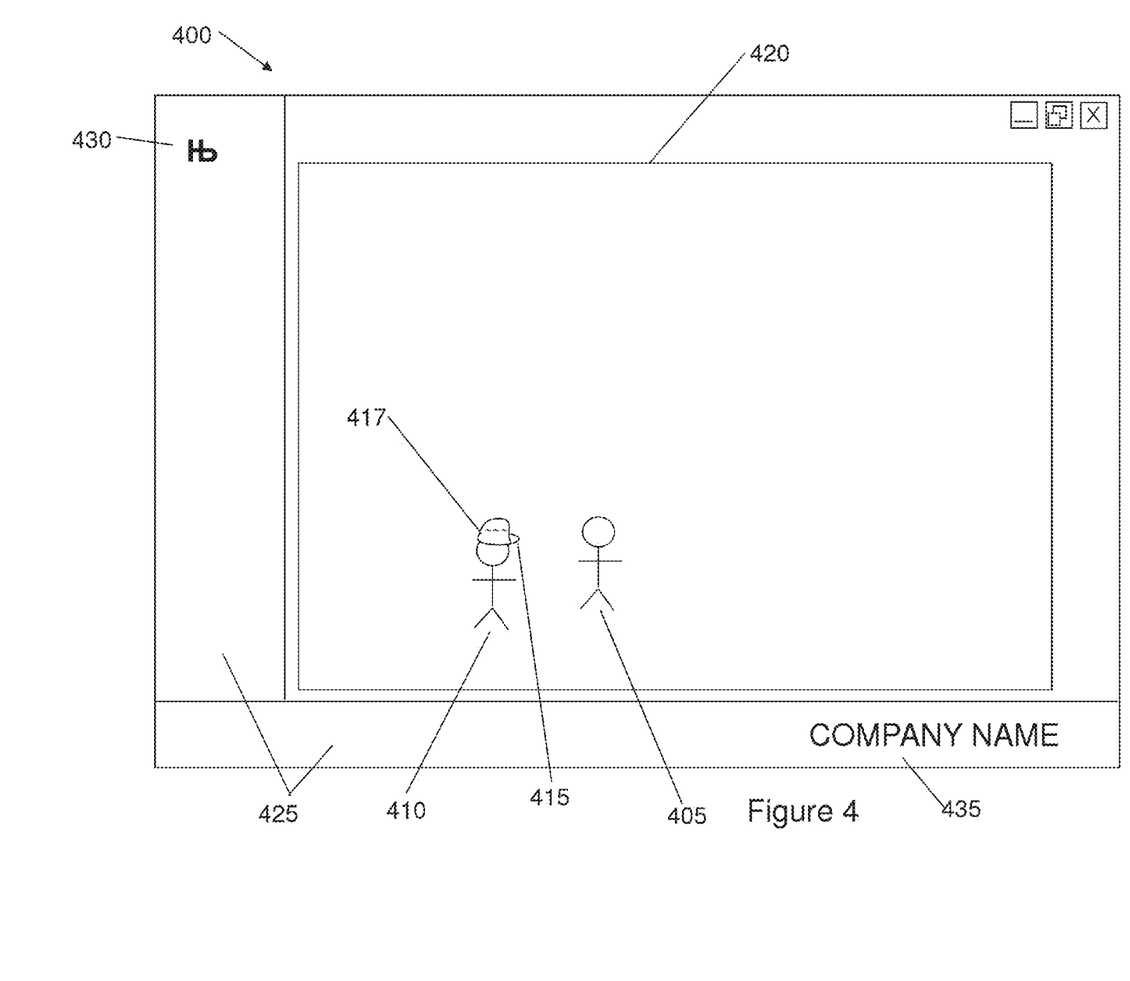
FIG. 4 shows an exemplary status bar enhancement in accordance with the invention.

According to further aspects of the invention, a status bar on the GUI or similar GUI regions capable of displaying regular text or graphical information, e.g., a title bar, may be used to display high-resolution information, e.g., promotional information. Using the example provided above, in embodiments, the VU monitoring tool 30 may detect a user's items associated with high-resolution information, e.g., promotional information, and may store this detected information in a database, e.g., the storage system 22B.

FIG. 4 shows an exemplary status bar enhancement according to an aspect of the invention. More specifically, FIG. 4 shows a screen shot 400 of a display as would be seen by a user of a first avatar 405 on the users end device, e.g., a personal computer. Additionally, FIG. 4 shows a second avatar 410 wearing an item, e.g., a hat 415, containing, e.g., promotional material 417. Within the VU, the second avatar 410 may communicate with or approach the first avatar 405. According to an aspect of the invention, the VU monitoring tool 30 may detect this communication or proximity and may direct the display tool 35 to display the high resolution promotional material in the status bar 425 on the GUI (or similar GUI regions capable of displaying regular test or graphical information) within the display of the first user's (i.e., the controller of the first avatar 405) end device. In embodiments, the promotional material may include a company's name 435 and/or a company's logo 430.

4. Audio Enhancement

Additionally, when audio presentation of information becomes popular, the creator, distributor, or seller of an item (e.g. avatar clothing) may derive additional revenue from clear presentations, in the form of audio information, that is associated with virtual universe items. Users may also enhance brand awareness through enhanced audio information. The sonification of such information in an audio output (e.g. the audio conversation between avatars) may have particular utility in that voice conversation methodologies already exist and are methods with which users are familiar. Furthermore, an audio conversation may be easy to understand. Moreover, a user's attention is often focused on the audio conversation, and thus, any information presented in this format is likely to be focused on by a user. Finally, employing an audio conversation for promotional information results in the promotional information being sequestered from the visual portion of a VU and is not likely to interfere with the viewing of the primary graphical content, which might otherwise be obscured with numerous text labels.

Thus, in embodiments, the promotional information may include the sonification of such information in a voice conversation. For example, a company name may be spoken (e.g., via known text-to-speech methods) at the start or ending of an audio conversation, or during a mutual silent time in the audio stream.

Conflict Resolution

In the event that an avatar has multiple promotional items, the display tool 35 may employ a conflict resolution method to determine which promotional information (respectively associated with the multiple items) will be displayed. In embodiments, the display tool 35 may utilize one or more of a round robin resolution, a promotion per rendering resolution, a contract resolution and random presentation resolution, amongst other resolutions, to resolve the conflict.

With a round robin resolution, a round robin strategy is used to cycle through the alternative promotions. For example, if a user has two items associated with two different companies, the display tool 35 may alternate between displaying the associated promotional material respectively related to the two items.

With a promotion per rendering resolution, different promotions may be displayed through the different rendering methods. For example, if a user has two items associated with two different companies, the display tool 35 may display the promotional information associated with the first item using a chat window enhancement and may display the promotional information associated with the second item using a bubble window enhancement.

With a contract resolution, companies may bid for promotional preference. For example, companies which bid higher for a promotional preference may have their promotional information favored over those companies who bid less. Additionally, companies may express preferences on which high-resolution method should be used to display the information, and may contract a preference agreement with a VU provider. With a random presentation resolution, the presentation may be determined through a random grab of a semaphore, akin to the "timing races" accompanying an Ethernet transmission by a host computer.

Remuneration

VU operators may charge companies for placing or attaching promotional information to objects within a VU. In embodiments, companies may be required to pay per unique avatar viewing of promotional information. Other embodiments may require the company to pay per unique promotional object within the VU. Furthermore, VU operators may create additional revenue by permitting preference contracts as described above. Additionally, promotional items may contain links to other regions of the virtual universe, such as a store, and in embodiments the VU operators may charge companies for each "click" of the link.

Additionally, in embodiments, VU users may receive remuneration for displaying the promotional items. That is, while, as described above, VU users may be motivated to use, e.g., wear, the promotional items for the benefit those items may provide, e.g., access to special areas of the VU, the invention contemplates that VU users may be receive remuneration (e.g., currency, virtual currency, coupons, etc.) for displaying the promotional items.

According to further aspects of the invention, the remuneration tool 40 may be used to track the placement or attachment of promotional information to objects within a VU and track instances of viewings of the promotional material. In embodiments, the remuneration tool 40 may use item UUIDs to track the items, and may store the tracking information in a database, e.g., storage system 22B. Additionally, in embodiments, the remuneration tool 40 may track instances of avatars displaying the promotional items, e.g., by tracking the item UUIDs, to provide remuneration to the user.

Other Embodiments

In further embodiments, the promotional text and/or images may be displayed in a title bar or a dedicated window in a user interface. Additionally, while traversing a VU, a user may be provided with a through-the-eyes-of-the-avatar perspective and the display may include a map of the VU. The invention contemplates that the promotional text and/or images may be placed on the map, e.g., in a transparent manner and/or within the map window. Additionally, in embodiments, the promotional text and/or images may only be displayed for a predetermined period of time and may dissolve or fade away after the predetermined period of time.

Further, while the invention has been described as invoking the promotional information display when an avatar is using (e.g., wearing or holding) an item, the invention contemplates that the promotional information display may be invoked if the avatar has the item in their inventory without actually using the item.

Additionally, while the invention has been described using the VU monitoring tool 30, the display tool 35 and the remuneration tool 40, the invention contemplates that any of the operations performed by the VU monitoring tool 30, the display tool 35 and the remuneration tool 40 may be performed manually by a user (e.g., a VU manager, an advertiser or a service provider). For example, in embodiments, a VU manager may determine remuneration manually.

Flow Diagram

Figure 5:
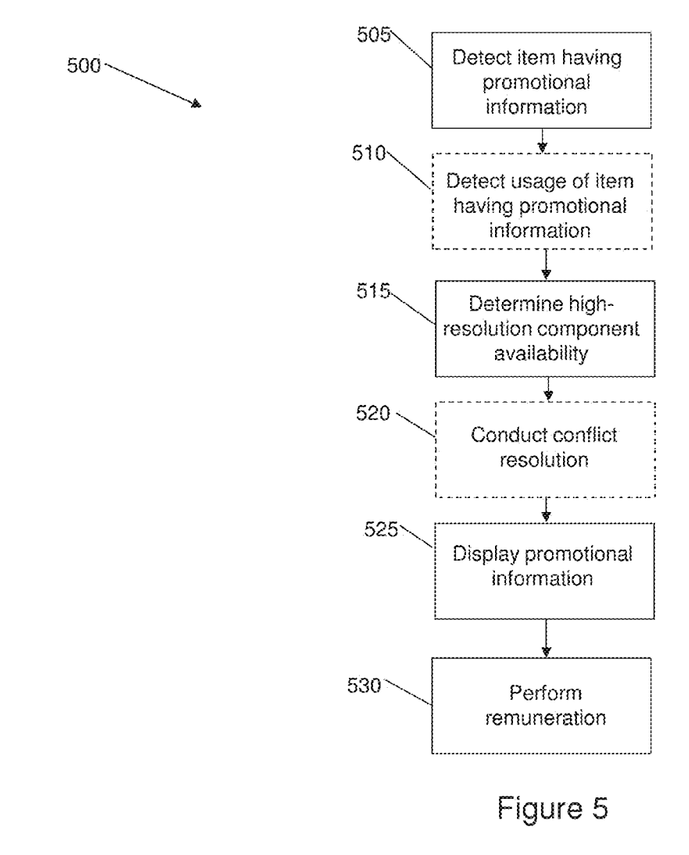
FIG. 5 is an exemplary flow chart of steps for implementing aspects of the invention.

FIG. 5 shows an exemplary flow for performing aspects of the present invention. The steps of FIG. 5 may be implemented in the environment of FIG. 1, for example. The flow diagram may equally represent a high-level block diagram of the invention. The flowchart and/or block diagram in FIG. 5 illustrates the architecture, functionality, and operation of possible implementations of systems, methods and computer program products according to various embodiments of the present invention. In this regard, each block in the flowchart or block diagram may represent a module, segment, or portion of code, which comprises one or more executable instructions for implementing the specified logical function(s). It should also be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. Each block of each flowchart, and combinations of the flowchart illustrations can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 5 shows an exemplary flow 500 for performing steps of the invention. At step 505, the VU monitoring tool detects an item having associated promotional information in a avatar's inventory. At step 510, the VU monitoring tool determines if an avatar is using, e.g., wearing or holding an item having associated promotional material. It should be understood that step 510 is an optional step, as represented by the dashed lines. At step 515, the VU monitoring tool determines the availability of high-resolution components for displaying the promotional information. At step 520, the display tool may conduct a conflict resolution. It should be understood that step 520 is an optional step, as represented by the dashed lines. At step 525, the display tool directs the display of the promotional information. At step 530, the remuneration tool performs a remuneration determination for, e.g., the VU provider and/or the VU user.

It should be understood, that while the steps have been described as occurring in a particular order, the invention contemplates that the steps may be performed in other orders. For example, step 505 (and optional step 510) may occur after step 515. Furthermore, the invention contemplates that, in embodiments, steps may be implied or omitted while still remaining true to this invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure having computer executable code tangibly embodied on a computer readable medium, comprising:

detecting an item not in view and associated with an avatar of a virtual universe (VU) user in a VU, the item comprising metadata indicating that branding information associated with the item is to be rendered in a component of the VU, and the metadata being set based on acquisition of the item, wherein the metadata includes information of an agreement entered at the acquisition of the item;

determining the branding information associated with the item;

displaying, after the detecting and the determining, the branding information in the VU in the component of the VU comprising at least one of:
a chat window;
a graphical user interface (GUI) status bar;
a GUI title bar; and
a map window; and matching the branding information of the item with the rendering capabilities of an area of the VU.

2. The method of claim 1, further comprising determining an availability of the component of the VU based on an end device of the VU user.

3. The method of claim 1, further comprising determining if the avatar is currently using the item.

4. The method of claim 1, wherein the item associated with an avatar comprises an item contained in an inventory of the VU user.

5. The method of claim 1, further comprising:
detecting a second item including second branding information; and
conducting a conflict resolution method that selects one of the branding information and the second branding information for the displaying in the component of the VU.

6. The method of claim 1, further comprising determining remuneration based on the displaying of the branding information in the component of the VU.

7. The method of claim 1, wherein the branding information is automatically accessed from a database and automatically displayed in the component of the VU.

8. The method of claim 1, wherein the branding information is displayed on an end device of a second VU user avatar in response to at least one of:
an avatar of the second VU user coming into a proximity of the avatar; and
the avatar of the second VU user communicating with the avatar.

9. The method of claim 1, wherein the branding information is displayed on an end device of a second VU user in response to the second VU user requesting further information via an input device.

10. The method of claim 1, wherein a service provider at least one of creates, maintains, deploys and supports the computer infrastructure that performs the steps of claim 1.

11. The method of claim 1, wherein steps of claim 1 are provided by a service provider on a subscription, advertising, and/or fee basis.

12. The method of claim 1, wherein:
the component of the VU comprises a plurality of components of which at least one is selected therefrom, the plurality of components comprising:
the chat window;
the graphical user interface (GUI) status bar;
the GUI title bar; and
the map window; and the branding information comprises at least one of:
- a company logo;
- a company name;
- a company slogan;
- a company jingle; and
- a web link.

13. The method of claim 12, further comprising:
conducting a conflict resolution method to select the branding information for the displaying when multiple items associated with the avatar are detected, the conflict resolution method comprising one of a plurality of conflict resolution methods comprising:
- a round robin resolution method;
- a promotion per rendering resolution method;
- a contract resolution method; and
- a random presentation resolution method; and determining remuneration to at least one of a VU operator, a VU service provider and the VU user for one or more instances of the displaying of the branding information.

14. The method of claim 13, wherein the branding information is displayed on an end device of a second VU user in response to at least one of a plurality of events comprising an avatar of the second VU user:
- coming into a proximity of the avatar;
- communicating with the avatar; and
- requesting the branding information, wherein the requesting the branding information includes an input device placed over the avatar of the second user resulting in an additional display containing the branding information.

15. The method of claim 1, further comprising:
determining if the avatar is currently using the item;
determining if the avatar is currently using a second item including second promotional branding; and
conducting a conflict resolution method that selects one of the promotional branding and the second promotional branding for the displaying in a display area of the VU using the component of the VU.

16. A system, comprising:
a virtual universe (VU) monitoring tool configured to:
- detect an item of an avatar of a VU user that is not in view in a first display area in a VU, the item including promotional branding;
- determine branding information associated with the item; and
- detect a type of end device used to view the VU so as to determine an availability of the component of the VU based on the end device; and a display tool configured to display the promotional branding in a second display area in the VU using a component of the VU in a resolution that is higher than a resolution in which the promotional branding is in the first display area, wherein:
the component of the VU comprises at least one of:
- a map;
- a chat window;
- a graphical user interface (GUI) status bar;
- a GUI title bar; and
- a user, a creator, a distributor, or a seller of the item receives remuneration from a company based on the inclusion of the promotional branding with the item.

17. The system of claim 16, further comprising a remuneration tool configured to determine remuneration to at least one of a VU operator, a VU service provider and the VU user based on the displaying of the promotional branding in the second display area using the component of the VU, wherein the displaying of the promotional branding includes tracking the avatar of a VU user by tracking universally unique identifiers of the item of the avatar.

18. The system of claim 17, wherein a service provider at least one of creates, maintains, deploys and supports the computer infrastructure.

19. A computer program product comprising a non-transitory tangible computer usable memory device having readable program code embodied in the tangible memory device, the computer program product includes at least one component operable to:
- detect an item not in view and associated with an avatar of a virtual universe (VU) user in a VU, the item being an object associated with a first display area of the VU and including promotional branding;
- determine if the avatar is currently using the item;
- determine branding information associated with the item;
- display the promotional branding in a second display area of the VU using a component of the VU, wherein:
the promotional branding is in the second display area at a higher resolution than the promotional branding is in the first display area,
the item associated with an avatar is an item contained in the user's inventory, and
the component of the VU comprises at least one of:
- a map window;
- a chat window;
- a graphical user interface (GUI) status bar; and
- a GUI title bar; and match the promotional branding of the item with the capabilities of the second display.

20. The computer program product of claim 19, further comprising at least one component operable to:
- determine if the avatar is currently using a second item;
- determine branding information associated with the second item; and
- conduct a conflict resolution that selects the branding information associated with the first item over the branding information associated with the second item so that the branding information of the first item is displayed in the second display area over the branding information associated with the second item.

* * * * *